G. C. Mead.
Hay Loader.
Nº 71,198   Patented Nov 19, 1867

Witnesses:
A. Wickham Hoe
R. H. Seaton

Inventor:
Gideon C. Mead,
By How & Weston,
Attys.

United States Patent Office.

GIDEON C. MEAD, OF GUILFORD, NEW YORK.

Letters Patent No. 71,198, dated November 19, 1867.

IMPROVEMENT IN HAY-RAKERS AND LOADERS.

*The Schedule referred to in these Letters Patent and making part of the same.*

---

Specification of certain Improvements in Machines for Loading Hay, invented by GIDEON C. MEAD, of Guilford, in the county of Chenango, and State of New York.

My invention relates to certain improvements in hay-rakes and loaders, to be worked by horse-power, for gathering up the hay and depositing it upon the load.

The said improvements consist, first, in the combination with a jointed rake-head and spring of a roller for reducing the friction of the rake-head upon the guides, as hereinafter more fully set forth; second, in the combination, with the slide up which the hay is drawn, of an additional or supplementary plate or portion, having a slightly-curved lower edge, which additional portion may be raised or lowered, so as to make it approach more or less closely to the surface of the ground, as the depth or condition of the hay may require; third, in the combination, with a series of rake-heads carried by an endless apron or belts, said rake-heads being jointed at or near their centres, and the guide against which the middles of said rake-heads rest when the rake-teeth are gathering the hay, of a spring which allows said guide to rise, when required, in passing over uneven ground, and thus prevent the breaking or injuring of the rake-teeth or other part of the machine. In the accompanying drawings—

Figure 1:
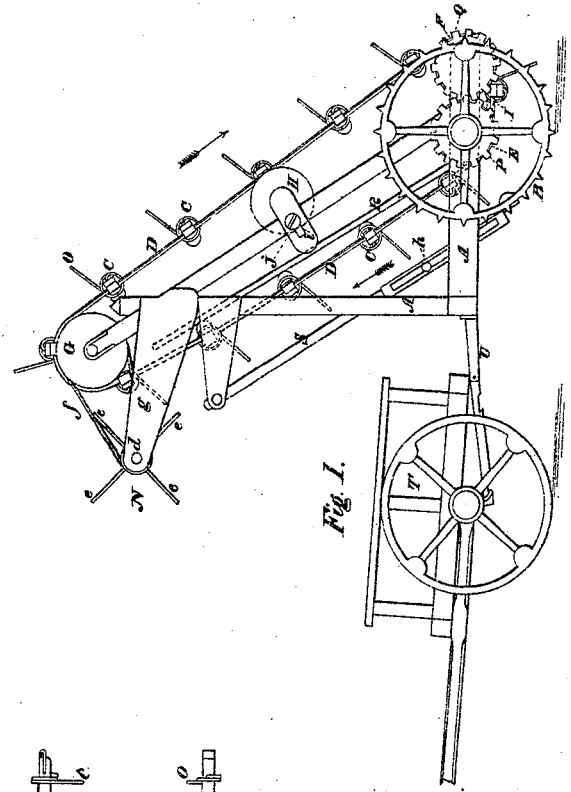
Figure 1 is a side elevation of my improved hay-rake and loader.
Figure 3:
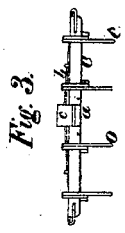
Figure 3 is a side view in detail of one of the rake-heads.
Figure 4:
Figure 4 is a view in detail of the lower side of the said rake-head, as seen in fig. 3.
Figure 5:
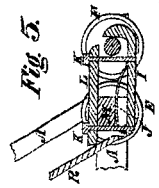
Figure 5 is a section in detail, through the line $x\,x$, fig. 2, showing a device by which the rake-heads may adapt themselves to uneven ground.
Figure 2:
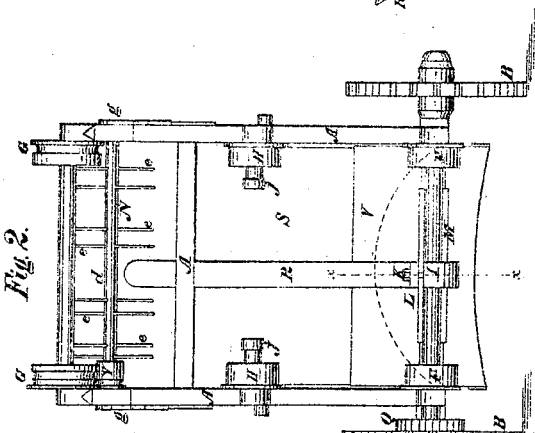
Figure 2 is a rear view of the same, the endless belts or apron, and the rake-heads attached thereto, being removed.

A is the frame of the machine, B the driving-wheels, and D the endless belts or apron, to which the rake-heads C are attached. E, F, and G are guide-rollers or pulleys, on which the endless belts D run. The shafts on which the pulleys E and F are secured are geared together by cog-wheels P and Q, so that the said pulleys E and F both serve as driving-pulleys to drive the rakes. H are two supplementary pulleys, about half way from F to G, which serve to steady the belts and prevent their vibrating, and also to tighten said belts by means of the slots $i$ and bolts $j$. I is a guide, against which the middle of the rake-heads rest when the rake-teeth are gathering the hay. It is held down in its place by the spring J, and kept in position by the bolts K. These bolts are fitted into the piece L, which is secured to the axle M loosely, so that they will readily slide up and down. Their lower ends are screwed firmly in the guide I, and move with it. R is a guide, which supports the middle of the rake-heads, as they pass up loaded with hay, and S is a slide or apron, upon which the hay is pushed up by the rake-teeth. O are the teeth of the rakes, secured to the rake-heads C, by a spiral spring formed on their upper ends, so that if one or more should strike an obstruction, such tooth or teeth would yield and not break. The rake-heads C are formed in two parts, connected together by a hinge-piece, $a$, and are held straight except when bent by the unevenness of the ground, by the springs $b$. A friction-roller, $c$, hung on the central part of this spring, serves to reduce the friction of the rake-head against the guides I and R, as it slides along in contact with said guides. N is the clearer, which insures the removal of the hay from the teeth of the rakes, after they pass the top of the slide S. The hay will usually drop from the teeth of the rakes, but by the use of the clearer N, its doing so is made more certain. This clearer consists of a shaft, $d$, secured in bearings $g$, and provided with radial arms $e$. It is revolved in a direction the reverse of that of the roller or pulley G, by means of the belt $f$, which runs in grooves or on a suitable part of the pulleys G and Y. T represents any suitable cart or wagon for receiving the hay, the machine being fastened thereto by means of a tongue, U, in any suitable manner. This fastening may be so constructed and arranged that the hay may be deposited upon any desired part or parts of the wagon or cart. On the slide S, up which the hay slides, or attached thereto, is a supplementary piece or slide, V, which may be adjusted to any desired height, by means of the bolts $h$.

In operating this machine, it is attached by means of the tongue U to any suitable vehicle, and the slide V being adjusted at a suitable height from the ground, the vehicle is moved forward. The wheels B, which carry the machine, having teeth or projections on their peripheries, revolve, thereby turning the cog-wheel P, which drives the cog-wheel Q. By this means the pulleys E and F are revolved, and they drive the belts D and rakes C in the direction indicated by the arrows. As the machine advances the hay is gathered in front of the rake-teeth, and drawn up on the slides V and S, and discharged at the top of the slide S, whence it falls upon the wagon or cart below. Should any of the hay adhere to the rake-teeth after they have passed entirely above the slide S, and within reach of the arms $e$ of the clearer N, the said arms $e$ will clear such hay from the said teeth. In passing over ground which is somewhat uneven, the rake-heads will accommodate themselves thereto, by means of the springs $b$ and J, which permit the said rake-heads to yield, when necessary, for that purpose. The spring in the rake-teeth will also act in conjunction with the springs $b$ and J to the same end.

I claim as my invention—

1. The combination, with the hinge-piece $a$ and spring $b$, of the roller $c$, substantially as and for the purpose specified.

2. The combination with the slide S of the supplementary slide or piece V, substantially as and for the purpose set forth.

3. The combination, with the rake-heads C and guide I, of the spring J, substantially as and for the purpose described.

GIDEON C. MEAD.

Witnesses:
  N. W. CADY,
  THOMAS DICKINSON.